(12) United States Patent
Chen et al.

(10) Patent No.: US 7,376,270 B2
(45) Date of Patent: May 20, 2008

(54) DETECTING HUMAN FACES AND DETECTING RED EYES

(75) Inventors: Xinwu Chen, Beijing (CN); Wang Jianmin, Beijing (CN); Yue Zhang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/023,965

(22) Filed: Dec. 29, 2004

(65) Prior Publication Data

US 2005/0169520 A1 Aug. 4, 2005

(30) Foreign Application Priority Data

Dec. 29, 2003 (CN) .................... 2003 1 0116033
Aug. 6, 2004 (CN) .................... 2004 1 0062680

(51) Int. Cl.
*G06K 9/00* (2006.01)

(52) U.S. Cl. .................. 382/167; 382/162; 382/164; 382/274; 382/275; 382/190; 358/1.9; 358/537

(58) Field of Classification Search ............. 382/162, 382/164, 165, 166, 167, 173, 274, 275; 358/1.9, 358/537, 448, 538

See application file for complete search history.

(56) References Cited

U.S. PATENT DOCUMENTS

2005/0129331 A1* 6/2005 Kakiuchi et al. ........... 382/275

* cited by examiner

*Primary Examiner*—Matthew C. Bella
*Assistant Examiner*—Ali A. B Bayat
(74) *Attorney, Agent, or Firm*—Fitzpatrick, Cella, Harper & Scinto

(57) ABSTRACT

The present invention provides a method and apparatus for detecting a red eye in an image. The method comprises steps of: calculating a skin color reference vector for said image; identifying a candidate for red eye region in said image; identifying skin color pixels in said candidate for red eye region; removing skin color pixels from said candidate for red eye region; deciding whether said candidate for red eye region is a red eye or not. The present invention also provides a method and apparatus for detecting a human face in an image. Moreover, the present invention provides corresponding storage medium including instructions for causing a processor to implement the methods. According to the present invention, red eyes and/or human faces can be detected with consideration of skin color pixels. The speed and accuracy of detecting red eyes and human faces are greatly increased.

8 Claims, 11 Drawing Sheets

401

402

Fig. 12c  Fig. 12d
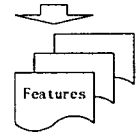
 
Fig. 13a            Fig. 13b

DETECTING HUMAN FACES AND DETECTING RED EYES

CROSS-REFERENCE TO RELATED APPLICATIONS

This application claims priorities from Chinese Patent Application No. 200310116033.4 filed on Dec. 29, 2003, and Chinese Patent Application No. 200410062680.6 filed on Aug. 6, 2004, which are incorporated hereby by reference.

FIELD OF THE INVENTION

The present invention relates to image processing, and particularly to a method, apparatus and storage medium for processing an image in which human faces and/or red eyes can be detected.

BACKGROUND OF THE INVENTION

Recently, human face detection technology is widely used in various application fields. For example, this technology can be used in digital video devices and office apparatus, such as digital camera, digital video camera, printer, scanner and the like. It is well known that images of persons are the principal part of a digital image in general. To make an image including one or more human faces reflect the object in a more real mode, some processes, such as automatically remedying skin color of the face, removing red eyes, removing glasses, judging expressions of the face and the like, should be performed. All the above processes are based on human face detection technology.

Human face detection is a process of detecting the locations in images where faces are present. However, face detection is a challenging task because of variability in scale, location, orientation (up-right, rotated), and pose (frontal, profile). Facial expression and lighting conditions also change the overall appearance of faces.

Conventionally, the methods for face detection are classified into four categories, i.e., knowledge-based methods, feature-based methods, template matching methods and appearance-based methods.

The knowledge-based methods encode human knowledge of what constitutes a typical face. Usually, the rules capture the relationships between facial features. These methods are designed mainly for face localization.

The feature-based methods aim to find structural features that exist even when the pose, viewpoint, or lighting conditions vary, and then use these to locate faces. These methods are designed mainly for face localization.

In the template matching methods, several standard patterns of a face are stored to describe the face as a whole or the facial features separately. The correlations between an input image and the stored patterns are computed for detection. These methods have been used for both face localization and detection.

In the appearance-based methods, the models are learned from a set of training images which should capture the representative variability of facial appearance. These learned models are then used for detection. These methods are designed mainly for face detection.

In the feature-based methods, invariant features of faces are found for detection. The underlying assumption is based on the observation that humans can effortlessly detect faces and objects in different poses and lighting conditions, and therefore there must exist properties or features which are invariant over these variabilities. Numerous methods have been proposed to first detect facial features and then to infer the presence of a face. Facial features such as eyebrows, eyes, nose, mouth, and hair-line are commonly extracted using edge detectors. Based on the extracted features, a statistical model is built to describe their relationships and to verify the existence of a face. One problem with these feature-based algorithms is that the image features can be severely corrupted due to illumination, noise, and occlusion. Feature boundaries can be weakened for faces, while shadows can cause numerous strong edges which together render perceptual grouping algorithms useless.

In general, facial features, texture in human faces and skin color are taken as the feature invariant in the feature-based methods. Further, several facial features, such as skin color, size and shape are combined to find face candidates, and then verify these face candidates using local, detailed features such as eye brows, nose, and hair etc.

Human skin color has been used and proven to be an effective feature in many applications for face detection. Color information is an efficient tool for identifying facial areas and specific facial features if the skin color model can be properly adapted for different lighting environment. However, such skin color models are not effective where the spectrum of the light source varies significantly. In other words, color appearance is often unstable due to changes in both background and foreground lighting.

Moreover, many of the above models only can process the images of specified races. If a skin color model for a specific race is used to process an image including one or more human faces of other race, wrong result may occur.

These prior skin color models use absolute values of face skin colors of the face candidates to determine whether or not they are real human faces. In other words, these skin color models explicitly define the boundaries of skin cluster in some color space.

Therefore, it is difficult to determine exactly whether or not the images taken under various illumination conditions are real human faces. Also, the prior skin color models cannot be used to process the images including the human faces of various races.

Red eye is the appearance of an unnatural red hue around a person's pupil. It is usually caused by the light of flash reflection from the blood vessels. At present, there are numerous methods of identifying red eyes.

In the existent methods of identifying red eyes, candidates for red eye regions are first identified in a digital image, and then further detections or calculations are made to determine whether the candidates for red eye regions are red eyes or not. Usually the candidates for red eye regions include skin color pixels, but not red eye pixels. The inclusion of skin color pixels in candidates for red eye regions lowers the accuracy of detecting red eyes.

SUMMARY OF THE INVENTION

The object of the present invention is to provide a method, an apparatus and a storage medium for detecting a human face region and/or a red eye region in an image with consideration of skin color pixels.

For achieving the above object, the present invention provides a method of detecting a red eye in an image, characterized by comprising steps of:

calculating a skin color reference vector for said image;

identifying a candidate for red eye region in said image;

identifying skin color pixels in said candidate for red eye region;

removing skin color pixels from said candidate for red eye region;

deciding whether said candidate for red eye region is a red eye or not.

The present invention further provides an apparatus for detecting a red eye in an image, characterized by comprising:

a calculator adapted to calculate a skin color reference vector for said image;

a candidate identifier circuit adapted to identify a candidate for red eye region in said image;

a candidate processor adapted to identify skin color pixels in said candidate for red eye region, and to remove said skin color pixels from said candidate for red eye region;

a deciding unit adapted to decide whether said candidate for red eye region output by said candidate processor is a red eye or not.

The present invention further provides a method for detecting a human face in an image, characterized by comprising steps of:

obtaining samples of skin colors of a face candidate;

calculating relative distances, from the color of said samples, of the pixels in said face candidate;

calculating a feature vector for said face candidate based on said relative distances; and analyzing said face candidate to determine whether it is a human face based on said feature vector.

The present invention further provides an apparatus for detecting a human face in an image, characterized in that said apparatus comprises:

an obtaining unit adapted to obtain samples of skin colors of a face candidate;

a relative distance calculator adapted to calculate relative distances, from the color of the samples, of the pixels in the face candidate;

a feature vector calculator adapted to calculate a feature vector for the face candidate based on the relative distances; and an analyzing unit adapted to analyze the face candidate to determine whether or not it is a human face based on said feature vector.

The present invention further provides a storage medium encoded with machine-readable computer program codes for detecting a red eye in an image, the storage medium including instructions for causing a processor to implement the method according to the present invention.

The present invention further provides a storage medium encoded with machine-readable computer program codes for detecting a human face in an image, the storage medium including instructions for causing a processor to implement the method according to the present invention.

According to the method, apparatus and storage medium for detecting a red eye of the present invention, red eyes are detected based on candidate for red eye regions from which skin color pixels have been removed. Thus, speed and accuracy of detecting red eyes are greatly increased.

And, since the method or apparatus for detecting a human face uses a relative skin color model, it can be used to determine exactly whether or not the images taken under various illumination conditions are real human faces, the determined results being not affected by the illumination conditions. Also, it can be used to process the images including the human faces of various races.

Additionally, the methods of the present invention can be easily combined with various conventional methods of identifying a face rectangle, identifying candidates for red eye regions and detecting red eyes from candidates for red eye regions so as to fit in different situations.

Other features and advantages of the present invention will be clearer from the following description of the preferred embodiments, taken in conjunction with the accompanying drawings, which illustrate, by way of example, the principles of the invention.

BRIEF DESCRIPTION OF THE DRAWINGS

FIGS. 12a-12d show a process of the method for detecting a human face according to the present invention;

FIG. 13a and FIG. 13b show respectively two face candidates, one of which is a human face and the other is not.

DETAILED DESCRIPTION OF THE PREFERRED EMBODIMENT

In the following description, as to how to identify a candidate for human face region, how to identify eye areas in a human face, reference can be made to Chinese Patent Application No. 00127067.2 filed by the same applicant on Sep. 15, 2000, Chinese Patent Application No. 01132807.X filed by the same applicant on Sep. 6, 2001, Chinese Patent Application No. 02155468.4 filed by the same applicant on Dec. 13, 2002, Chinese Patent Application No. 02160016.3 filed by the same applicant on Dec. 30, 2002, Chinese Patent Application No. 03137345.3 filed by the same applicant on Jun. 18, 2003, etc. These applications are incorporated here for reference. However, the method of identifying candidates for human face region, the method of identifying eye areas and the method of detecting red eyes from candidates for red eye region disclosed in these applications constitute no restriction to the present invention. Any conventional methods of identifying a face rectangle in an image, identifying a candidate for red eye region, and deciding whether a candidate for red eye region is a red eye or not may be utilized in the present invention.

Figure 6:
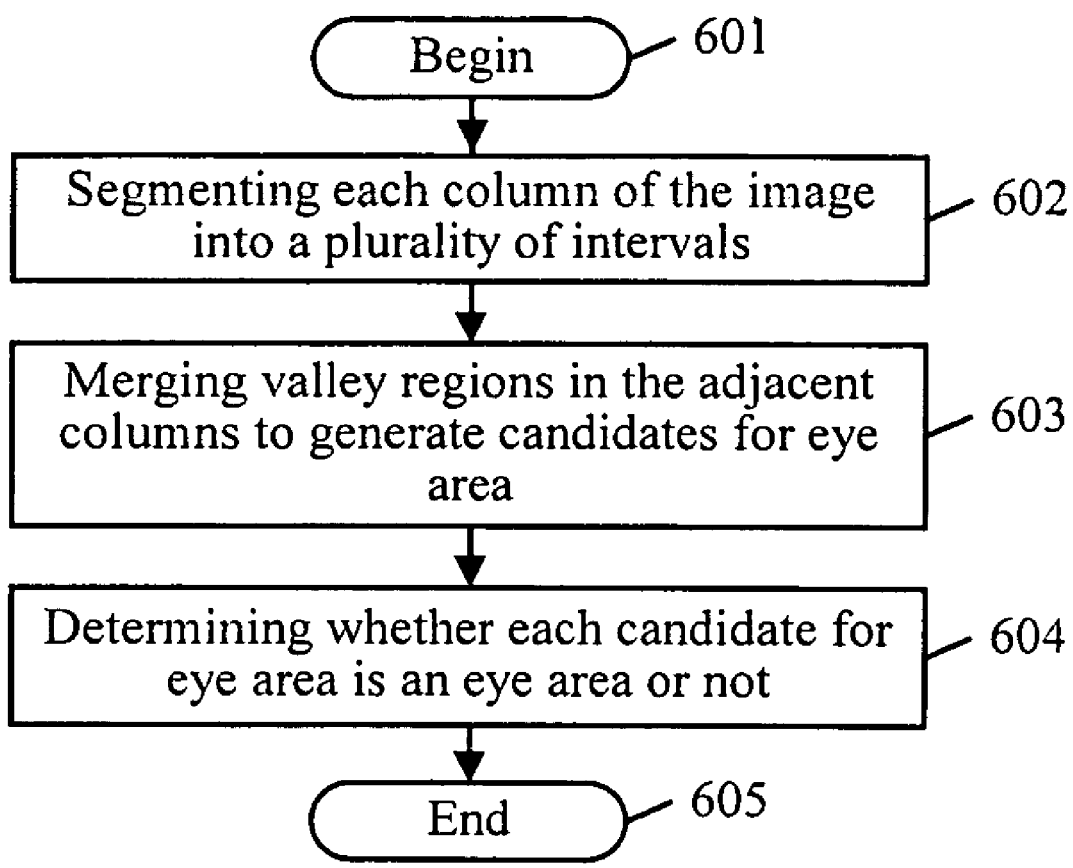
FIG. 6 shows an exemplified method of identifying an eye area in an image.

FIG. 6 shows an exemplified method of identifying an eye area in an image. The method begins at step 601. Then at step 602, each column of the image is segmented into a plurality of intervals.

At step 603, valley regions in the adjacent columns are merged in order to generate candidates for eye area. Then, at step 604, it is determined whether each candidate for eye area is a real eye area or a false eye area.

Figure 7:
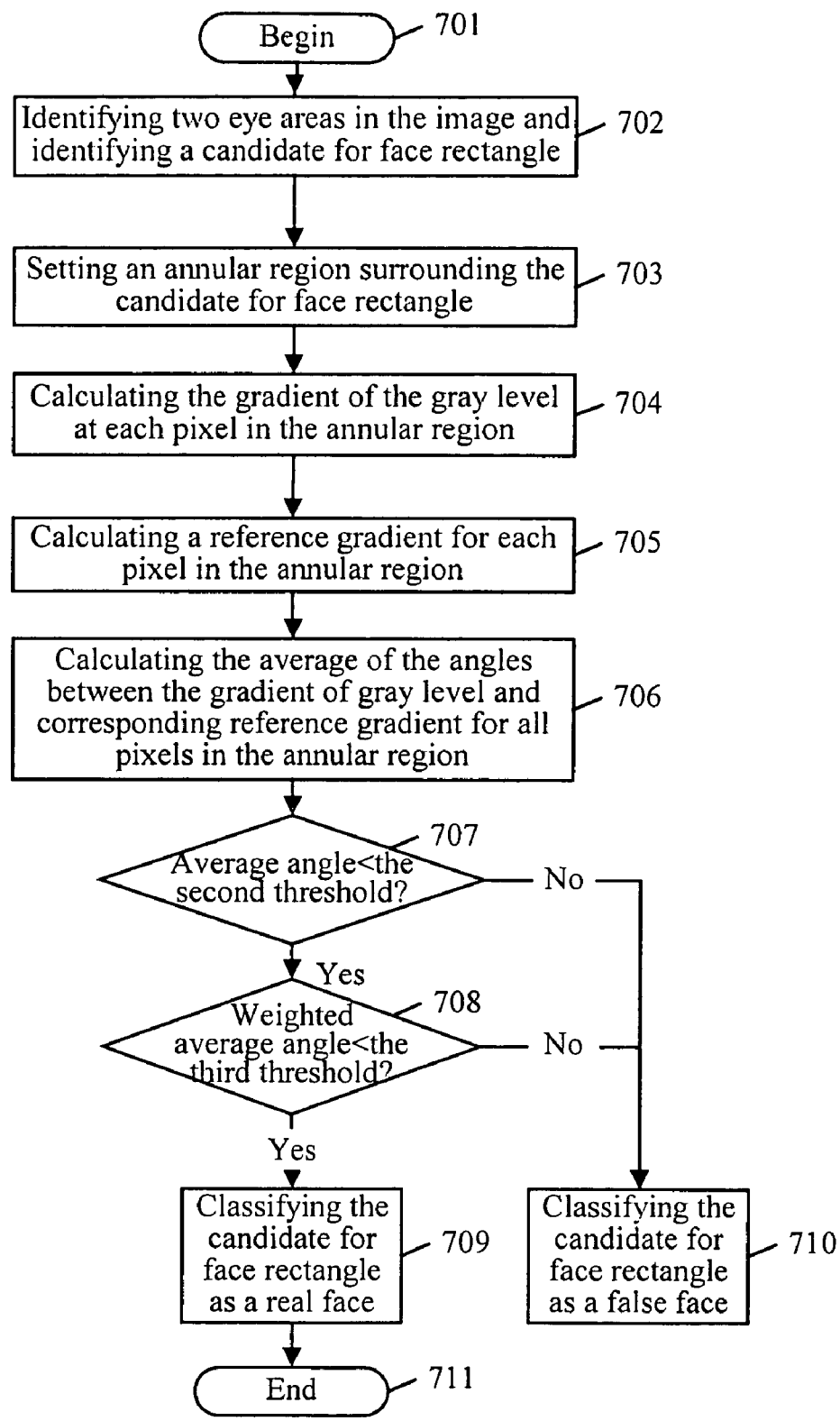
FIG. 7 shows an exemplified method of identifying a face rectangle in an image.

FIG. 7 shows an exemplified method of identifying a face rectangle in an image. The method begins at step 701. Then at step 702, two eye areas are identified in the image, and based on the two eye areas, a candidate for face rectangle is identified.

At step 703, an annular region surrounding the candidate for face rectangle is set. At step 704, for each pixel in the annular region, the gradient of the gray level is calculated. At step 705, for each pixel in the annular region, a reference gradient is calculated. At step 706, an average of the angles between the gradient of gray level and corresponding reference gradient for all pixels in the annular regions is calculated. At step 707, it is decided whether the average angle is less than the second threshold. If the decision of step 707 is "No", the process goes to step 710; otherwise, to step 708.

At step 708, it is decided whether the weighted average angle is less than the third threshold. If the decision of step 708 is "No", the process goes to step 710; otherwise, to step 709.

At step 709, the candidate for face rectangle is classified as a face rectangle (i.e., true face). At step 710, the candidate for face rectangle is classified as a false face (i.e., false face).

The process ends at step 711.

For more explanation of the methods shown in FIGS. 6 and 7, reference may be made to Chinese patent application No. 01132807.X.

Figure 8:
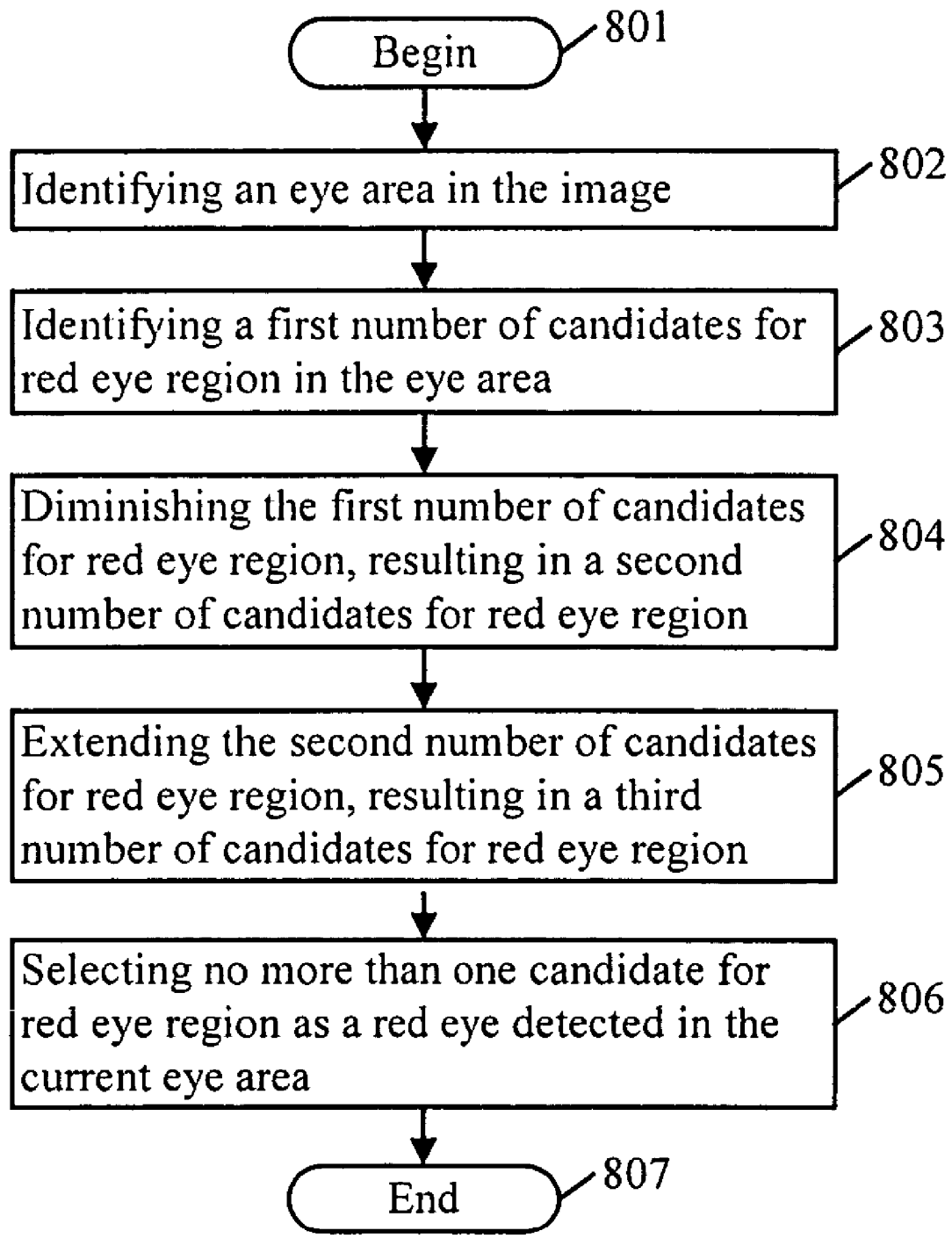
FIG. 8 shows an exemplified method of identifying a candidate for red eye region in an image.

FIG. 8 shows an exemplified method of identifying a candidate for red eye region in an image. The method begins at step 801. Then at step 802, an eye area is identified in the image.

At step 803, a first number of candidates for red eye region are identified in the eye area. In order to identify a candidate for red eye region in the eye area, characteristic values of pixels in the eye area are considered. At step 803, the color variance, or the texture, or the combination of color variance and texture of pixels in the eye area are for example considered.

At step 804, the first number of candidates for red eye region are diminished. As a result, a second number of candidates for red eye region are resulted.

According to the process of diminishing, at least one characteristic value of each pixel in each of the first number of candidates for red eye region is evaluated. If the evaluated characteristic value does not meet a standard set for red eye pixel, the evaluated pixel is removed from the relevant candidate for red eye region. Thus, the areas of most of the first number of candidates for red eye region are reduced. If all pixels included in a candidate for red eye region are removed, this candidate for red eye region does not exist and is not considered any more.

Thus, the second number, i.e., the total number of candidates for red eye region after step 804 is performed, may be less than the first number, i.e., the total number of candidates for red eye region before step 804 is performed.

At step 805, the second number of candidates for red eye region are extended. As a result, a third number of candidates for red eye region are resulted.

In this step, border pixels of each of the second number of candidates for red eye region are considered. A "border pixel" refers to a pixel located at the edge of a candidate for red eye region. If pixels in the vicinity of a border pixel meets a standard set for red eye pixel, these pixels are included into relevant candidate for red eye region. Thus, the areas of most of the second number of candidates for red eye region are increased, and inevitably some candidates for red eye region may merge with one another. This introduces another function of step 805.

Another function of step 805 is to selectively remove candidates for red eye region that merge, to selectively combine candidates for red eye region that merge, or to selectively keep one of the candidates for red eye region that merge while removing others.

The candidates for red eye region that are removed are not considered any more.

Thus, the third number, i.e., the total number of candidates for red eye region after step 805 is performed, may be less than the second number, i.e., the total number of candidates for red eye region before step 805 is performed.

At step 806, no more than one candidate for red eye region is selected as a red eye that is detected in the eye area.

In step 806, a lot of characteristic values of the pixels in the third number of candidates for red eye region are evaluated. Based on the evaluation results, most of the third number of candidates for red eye region are removed. The left candidates for red eye region are then scored and only the candidate for red eye region with the greatest score is further considered. If the only candidate for red eye region with the greatest score meets a standard, it is selected as a red eye detected in the current eye area. Otherwise, no red eye is detected in the current eye area.

At step 807, the process ends.

For more explanation of the method shown in FIG. 8, reference may be made to Chinese patent application No. 200310116034.9.

Figure 1:
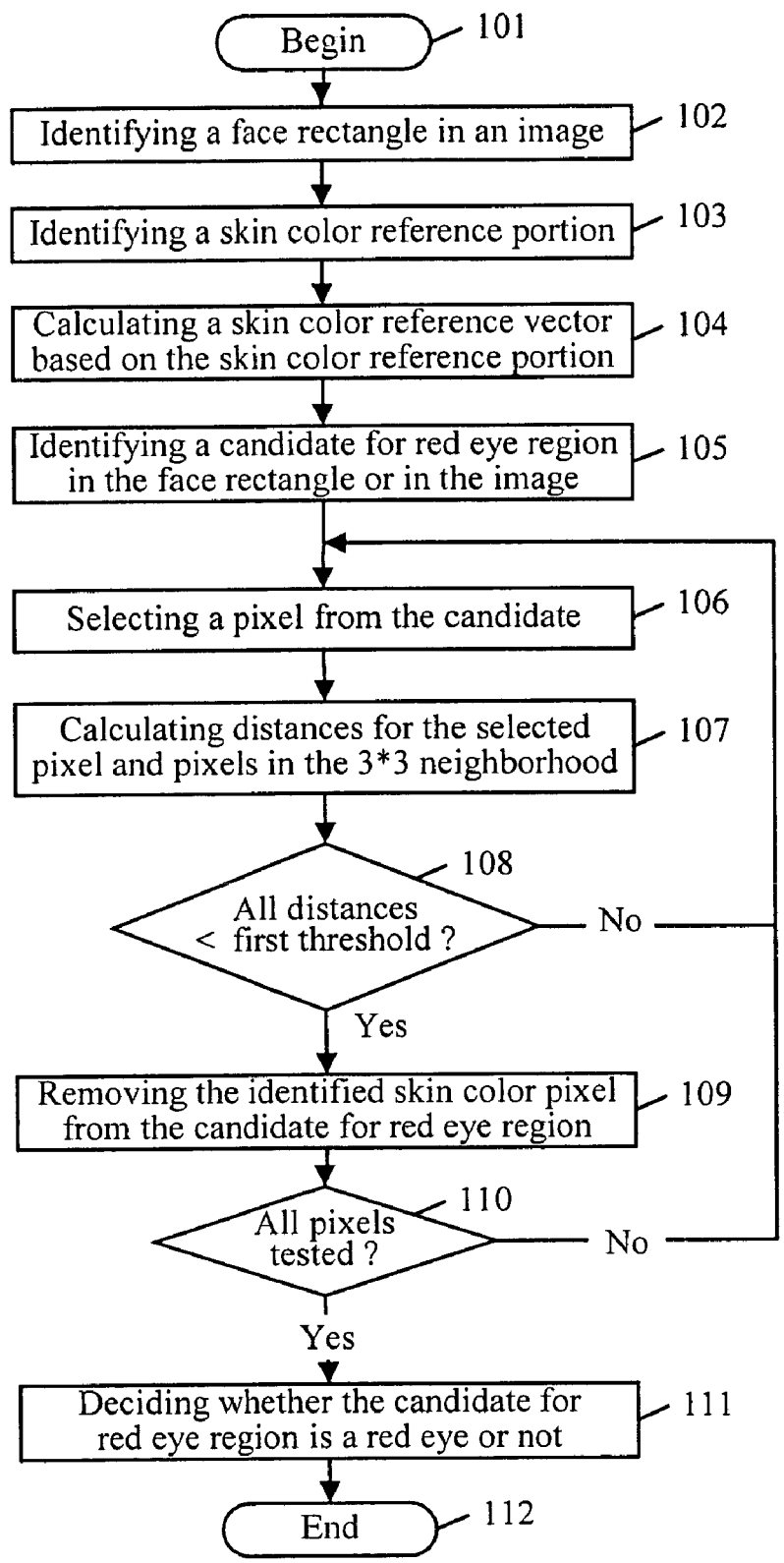
FIG. 1 is a flow chart of the method of detecting a red eye in an image with consideration of skin color pixels according to one embodiment of the present invention.

FIG. 1 is a flow chart of the method of detecting a red eye in an image according to one embodiment of the present invention.

As shown in FIG. 1, the process begins at step 101. Then at step 102, a face rectangle is identified in the image to be processed. Different ways of identifying face rectangle in an image constitute no restriction to the present invention.

Figure 2:
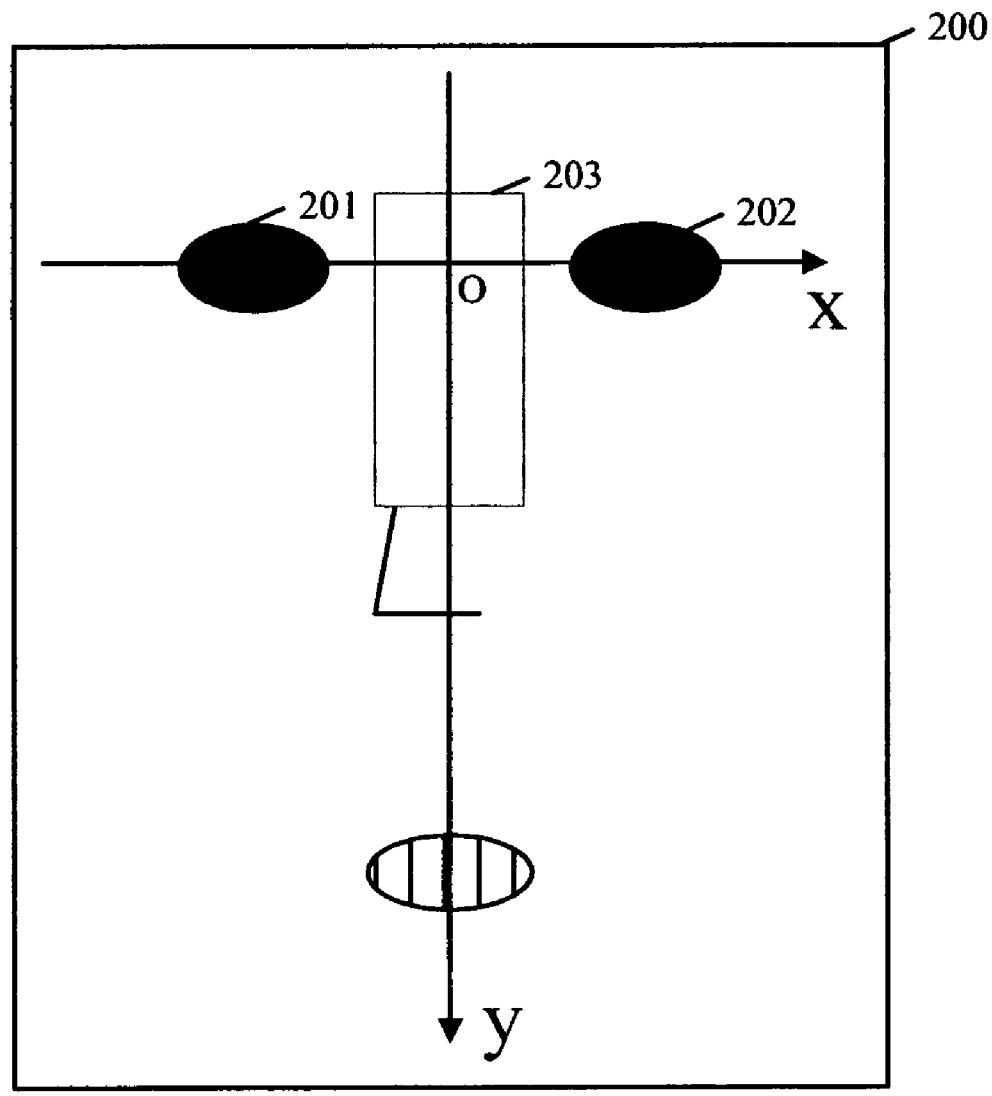
FIG. 2 shows a face rectangle including a skin color reference portion for obtaining a skin color reference vector.

Next, at step 103, a skin color reference portion is identified in said face rectangle. An example of the skin color reference portion is shown in FIG. 2. Various methods of identifying skin color reference portion can be used. Different size and shape of the skin color reference portion, and the identifying method constitute no restriction to the present invention.

At step 104, a skin color reference vector is calculated in the skin color reference portion.

Assume $\bar{x}$ is the skin color reference vector. $\bar{x}$ comprises a R (Red) value $\bar{x}_r$, a G (Green) value $\bar{x}_g$, and a B (Blue) value $\bar{x}_b$. R value $\bar{x}_r$ is an average red color value for pixels included in the skin color reference portion. G value $\bar{x}_g$ is an average green color value for pixels included in the skin color reference portion. B value $\bar{x}_b$ is an average blue color value for pixels included in the skin color reference portion. R, G, B values $\bar{x}_r$, $\bar{x}_g$ and $\bar{x}_b$ are calculated based on the following equations:

$$\bar{x}_r = \frac{\sum r}{n},$$

$$\bar{x}_g = \frac{\sum g}{n},$$

$$\bar{x}_b = \frac{\sum b}{n};$$

where r denotes the red value of a pixel in the skin color reference portion, g the green value of a pixel in the skin color reference portion, b the blue value of a pixel in the skin color reference portion, n the number of pixels in the skin color reference portion.

At step 105, a candidate for red eye region is identified in face rectangle 200 or in the whole image. Different ways of identifying a candidate for red eye region constitute no restriction to the present invention. Of course, step 105 may also precede step 103.

From step 106 to step 108, a skin color pixel is identified in the candidate for red eye region with reference to the skin color reference vector.

Specifically, at step 106, one pixel is selected from the candidate for red eye region.

At step 107, the distance (for example, the Mahalanobis distance) between the skin color reference vector and the color vector of the pixel that is selected at step 106 is calculated. Also, similar distance between the skin color reference vector and a color vector for each pixel in the neighborhood (for example, 3*3 neighborhood) of the pixel that is selected at step 106 is calculated. Alternatively, the distances may be Euclidean Distances. Different kinds of distance and different ways of selecting pixels constitute no restriction to the present invention.

The Mahalanobis distance between the skin color reference vector and the color vector for a pixel is calculated based on the following equation:

$$d = (x - \bar{x})^T \Sigma^{-1} (x - \bar{x})$$

where x denotes a color vector for a pixel, d denotes the Mahalanobis distance between the skin color reference vector and color vector x; $\bar{x}$ denotes the skin color reference vector which is calculated in step 104; "T" denotes a transpose of a vector or matrix; $\Sigma^{-1}$ denotes an inverse of the covariance matrix of the pixels in the skin color reference portion.

The covariance matrix is calculated based on the following equation:

$$\Sigma = \begin{pmatrix} \delta_r^2 & \delta_{rg}^2 & \delta_{rb}^2 \\ \delta_{rg}^2 & \delta_g^2 & \delta_{gb}^2 \\ \delta_{rb}^2 & \delta_{gb}^2 & \delta_b^2 \end{pmatrix}$$

wherein $\delta_r^2, \delta_g^2, \delta_b^2, \delta_{rg}^2, \delta_{rb}^2, \delta_{gd}^2$ are calculated with the following equations:

$$\delta_r^2 = \frac{\sum (x_r - \bar{x_r})^2}{n},$$

$$\delta_g^2 = \frac{\sum (x_g - \bar{x_g})^2}{n},$$

$$\delta_b^2 = \frac{\sum (x_b - \bar{x_b})^2}{n}$$

$$\delta_{rg}^2 = \frac{\sum (x_r - \bar{x_r})(x_g - \bar{x_g})}{n}$$

$$\delta_{rb}^2 = \frac{\sum (x_r - \bar{x_r})(x_b - \bar{x_b})}{n}$$

$$\delta_{gb}^2 = \frac{\sum (x_g - \bar{x_g})(x_b - \bar{x_b})}{n}$$

At step 108, it is decided whether all the Mahalanobis distances (for example, 9 distances for a 3*3 neighborhood, including a distance for the pixel selected at step 106, and 8 distances for the pixels in the 3*3 neighborhood) calculated at step 107 are less than the same first threshold. Based on experiments, the first threshold may range from 5 to 20, and preferably from 6 to 10. Here, the first threshold takes 8.

If the result of step 108 is "Yes", the process goes to the step 109; otherwise the process goes back to step 106.

Of course, step 108 may be amended to decide whether all the Mahalanobis distances calculated at step 107 are greater than the same first threshold. If so, the "Yes" branch of the decision at step 108 leads to step 106 and the "No" branch of the decision at step 108 leads to step 109.

At step 109, the pixel that is selected at step 106 and identified as a skin color pixel through step 108 is removed from the candidate for red eye region.

At step 110, it is decided whether all the pixels included in the candidate for red eye region have been tested through steps 106 to 108.

If the result of step 110 is "No", the process goes back to step 106, where one of the pixels that have not been tested is selected. If the result of step 110 is "Yes", the process goes to step 111.

After all skin color pixels have been removed from the candidate for red eye region, the original candidate for red eye region might result in more than one candidate for red eye region.

At step 111, it is decided whether the candidates for red eye region from which all skin color pixels have been removed are red eye regions or not. Different ways of deciding a candidate for red eye region is a red eye or not constitute no restriction to the present invention.

At step 112, the process ends.

FIG. 2 shows a face rectangle including a skin color reference portion for obtaining a skin color reference vector.

As shown in FIG. 2, reference 200 represents a face rectangle; reference numerals 201 and 202 represent two eyes in face rectangle 200. A coordinate system is set up. In the coordinate system, x-axis passes through the centers of left eye 201 and right eye 202, origin O is positioned at the midpoint between eyes 201 and 202, and y-axis is vertical to x-axis.

In FIG. 2, rectangle portion 203 is selected as a skin color reference portion. Assume the distance between origin O eyes 201 or 202 is 1. Skin color reference portion 203 is defined as A={(x,y)||x|<0.5; -0.5<y<1}. Of course, other portions of face rectangle 200 may be selected as the skin color reference portion.

Figure 3:
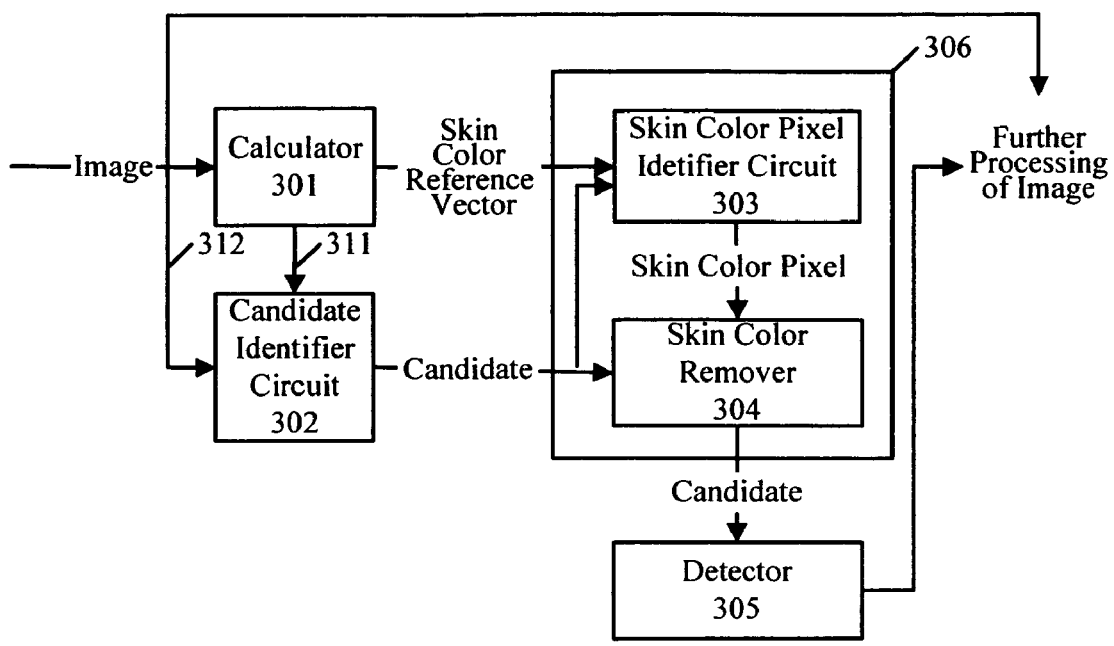
FIG. 3 is a block diagram of the apparatus for detecting a red eye in an image according to another embodiment of the present invention.

FIG. 3 is a block diagram of the apparatus for detecting a red eye in an image according to another embodiment of the present invention.

In FIG. 3, reference numeral 301 denotes a calculator, 302 a candidate identifier circuit, 303 a skin color pixel identifier circuit, 304 a skin color pixel remover, 305 a detector, and 306 a candidate processor.

Calculator 301 receives the image to be processed, and calculates a skin color reference vector. Calculator 301 may identify a skin color reference portion directly in the image, or first identify a face rectangle in the image and then identify a skin color reference portion in the face rectangle. Then, calculator 301 calculates a skin color reference vector based on the skin color reference portion.

Candidate identifier circuit 302 identifies a candidate for red eye region in the image (as shown by 312) or in the face rectangle that might be identified by calculator 301 (as shown by 311).

Candidate processor 306 identifies skin color pixels in the candidate for red eye region, and removes the skin color pixels from the candidate for red eye region. Specifically speaking, candidate processor 306 comprises skin color pixel identifier 303 and skin color remover 304.

Skin color pixel identifier 303 identifies a skin color pixel based on the distance between the skin color reference vector and the color vectors for pixels in the candidate for red eye region. Distances for pixels in the neighborhood of a pixel to be identified are also considered. Reference can be made to steps 106 to 108 in FIG. 1.

Skin color pixel remover 304 removes skin color pixels from the candidate for red eye region outputted by the candidate identifier circuit 302.

Detector 305 decides whether the candidate for red eye region that has been processed by candidate processor 306 is a red eye or not. The detection result of detector 305 can be used for further processing of the image.

Figure 4A:
FIGS. 4A, 4B and 4C show an example of a candidate for red eye region.
Figure 4B:
Figure 4C:

FIGS. 4A, 4B and 4C show an example of a candidate for red eye region. FIG. 4A shows the original image. FIG. 4B shows a candidate for red eye region 401 identified in the image shown in FIG. 4A. FIG. 4C shows the image in which skin color pixels have been removed.

An example is described below.

A face rectangle is identified from an image. The width of the face rectangle is 241 pixels. The height of the face rectangle is 297 pixels. A rectangular skin color reference portion is selected in the face rectangle. The width of the skin color reference portion is 15 pixels. The height of the skin color reference portion is 24 pixels. The skin color reference vector $\bar{x}$ is calculated as [2.18, 1.58, 1.29].

The covariance matrix $\Sigma$ is calculated as:

$$\sum = \begin{bmatrix} 0.62 & 0.04 & 0.03 \\ 0.04 & 0.07 & 0.07 \\ 0.03 & 0.07 & 0.11 \end{bmatrix}$$

Let the first threshold be 8.

Next, the Mahalanobis distances of all the pixels in the candidate for red eye region 401 are calculated.

Take pixels (111,56) and (111,40) for example. The color vectors for pixels (111,56) and (111,40) are [130/100, 79/100, 88/100] and [244/100, 197/100, 145/100].

Here, both the skin color reference vector and the color vectors for pixels are calculated from R (red) values, G (green) values and B (blue) values. In order to reduce the amount of computation, all R (red) values, G (green) values and B (blue) values of the pixels are divided by 100.

The Mahalanobis distance for pixel (111,56) is 16.8, which is not less than the first threshold. Thus, pixel (111, 56) is not identified as a skin color pixel.

The Mahalanobis distance for pixel (111,40) is 5.68, which is less than the first threshold. Suppose the Mahalanobis distances for the eight pixels in the 3*3 neighborhood of pixel (111, 40) are all less than the first threshold. Thus, pixel (111, 40) is identified as a skin color pixel, and is removed from candidate for red eye region 401.

Figure 5:
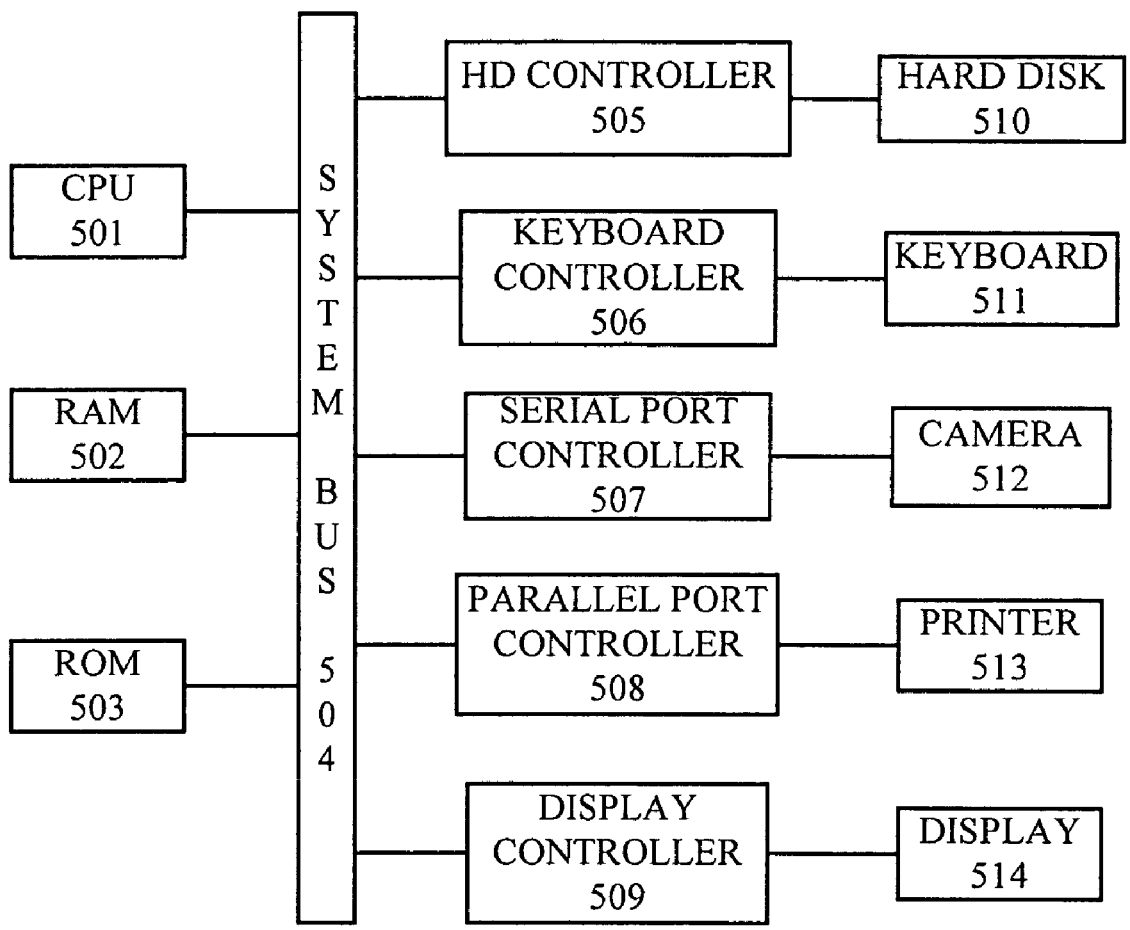
FIG. 5 schematically shows an image processing system in which the method shown in FIG. 1 can be implemented.

FIG. 5 schematically shows an image processing system in which the method shown in FIG. 1 can be implemented. The image processing system shown in FIG. 5 comprises a CPU (Central Processing Unit) 501, a RAM (Random Access Memory) 502, a ROM (Read only Memory) 503, a system bus 504, a HD (Hard Disk) controller 505, a keyboard controller 506, a serial port controller 507, a parallel port controller 508, a display controller 509, a hard disk 510, a keyboard 511, a camera 512, a printer 513 and a display 514. Among these components, connected to system bus 504 are CPU 501, RAM 502, ROM 503, HD controller 505, keyboard controller 506, serial port controller 507, parallel port controller 508 and display controller 509. Hard disk 510 is connected to HD controller 505, and keyboard 511 to keyboard controller 506, camera 512 to serial port controller 507, printer 513 to parallel port controller 508, and display 514 to display controller 509.

The functions of each component in FIG. 5 are well known in the art and the architecture shown in FIG. 5 is conventional. Such an architecture not only applies to personal computers, but also applies to hand held devices such as Palm PCs, PDAs (personal data assistants), digital cameras, etc. In different applications, some of the components shown in FIG. 5 may be omitted. For instance, if the whole system is a digital camera, parallel port controller 508 and printer 513 could be omitted, and the system can be implemented as a single chip microcomputer. If application software is stored in EPROM or other non-volatile memories, HD controller 505 and hard disk 510 could be omitted.

The whole system shown in FIG. 5 is controlled by computer readable instructions, which are usually stored as software in hard disk 510 (or as stated above, in EPROM, or other non-volatile memory). The software can also be downloaded from the network (not shown in the figure). The software, either saved in hard disk 510 or downloaded from the network, can be loaded into RAM 502, and executed by CPU 501 for implementing the functions defined by the software.

It involves no inventive work for persons skilled in the art to develop one or more pieces of software based on the flowchart shown in FIG. 1. The software thus developed will carry out the method of processing an image shown in FIG. 1.

In some sense, the image processing system shown in FIG. 5, if supported by software developed based on flowchart shown in FIG. 1, achieves the same functions as the apparatus for processing image shown in FIG. 3.

The present invention also provides a storage medium encoded with machine-readable computer program code for detecting a red eye in an image, the storage medium including instructions for causing a processor to implement the method according to the present invention. The storage medium may be any tangible media, such as floppy diskettes, CD-ROMs, hard drives (e.g., hard disk 510 in FIG. 5).

In the following description, another preferred embodiment of the present invention will be described as a method for detecting a human face that would ordinarily be embodied as a software program. Those skilled in the art will readily recognize that the equivalent of such software may also be constructed in hardware.

Furthermore, the software program may be stored in a computer readable storage medium, which may comprise, for example, magnetic storage media such as a magnetic disk (such as a floppy disk or a hard drive) or magnetic tape; optical storage media such as an optical disc; solid state electronic storage devices such as random access memory (RAM), or read only memory (ROM); or any other physical device or medium employed to store a computer program.

Figure 9:
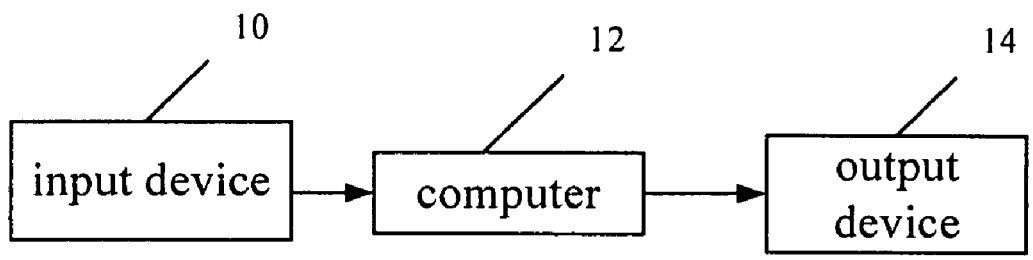
FIG. 9 is block diagram showing an apparatus suitable for practicing the method for detecting a human face in an image with consideration of skin color pixels according to one embodiment of the present invention.

FIG. 9 illustrates a typical image processing apparatus suitable for practicing the method of detecting a human face. The image processing apparatus includes an input device 10 for inputting an input digital image, a computer 12 for processing the input digital image to generate an output image, and an output device 14 for receiving and processing the output image. The input device 10 may be a digital camera or scanner, an Internet connection, a separate storage device, or the like. The computer 12 may be a personal computer, an MPU or the like. The output device 14 may be a digital printer, a display device, an Internet connection, a separate storage device, or the like.

Figure 10:
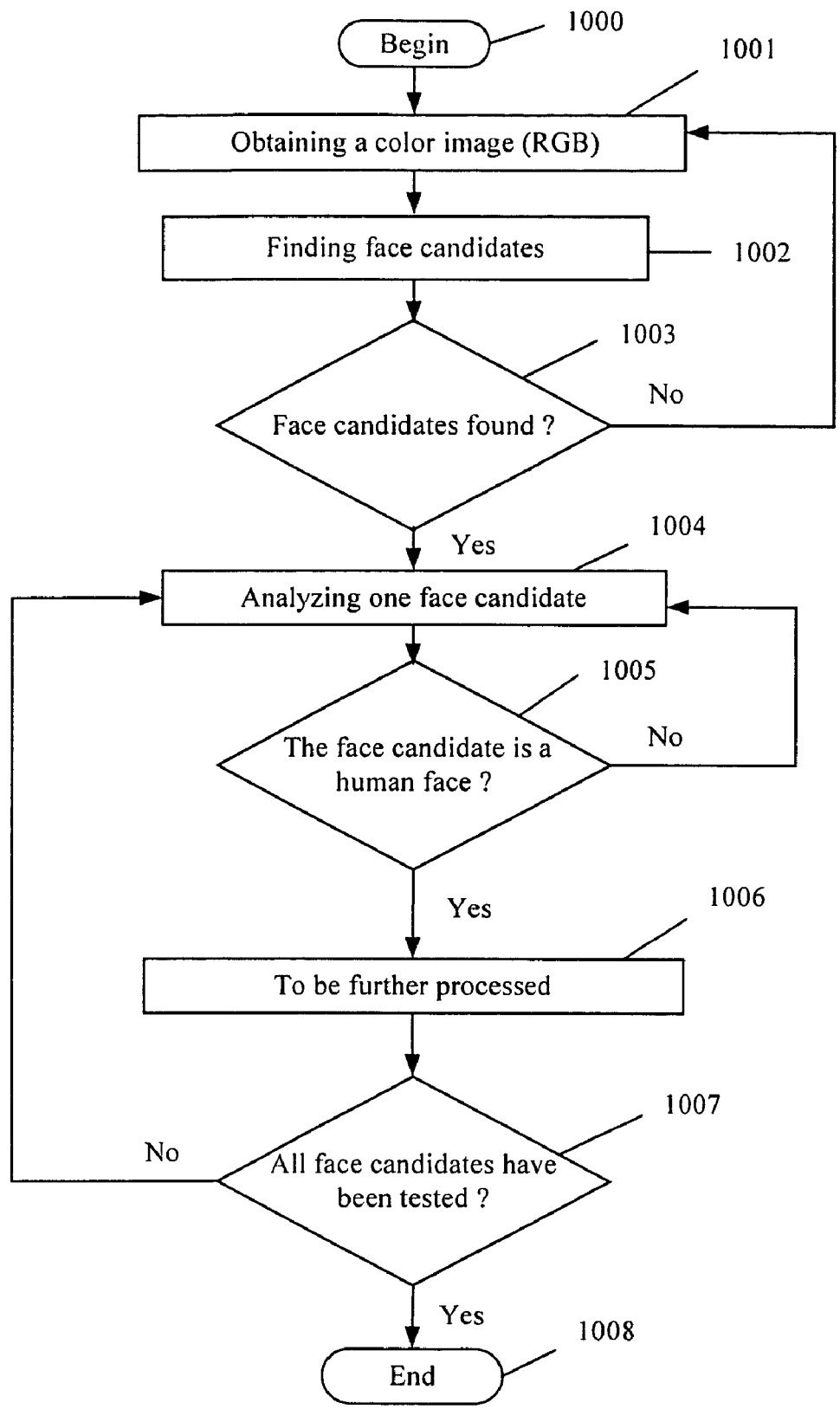
FIG. 10 is a flow chart of the method of detecting a human face in an image with consideration of skin color pixels according to one embodiment of the present invention.

FIG. 10 is a flow chart of a method for detecting a human face in an image with consideration of skin color pixels, according to one embodiment of the present invention. The method can be used to locate and detect a human face in a color image from a video image sequence. The video image sequence may be supplied in real time, for instance by a video camera, or be searched out from an image database.

As shown in FIG. 10, the process begins at step 1000.

Then, at step 1001, a digital image in the red, green and blue (RGB) format is obtained. For instance, this step may comprise storing the video data from a video camera.

At step 1002, the image is searched in order to locate areas constituting face candidates.

At step 1003, it is determined whether or not any face candidate has been found.

If no, the step 1001 is performed and the steps 1002 and 1003 are repeated until at least one face candidate is found in the latest image.

The above steps 1001-1003 can be performed in a conventional process.

Then, the process proceeds to step 1004 to analyze one face candidate.

Then, at step 1005, it is to determine whether or not this face candidate is a human face.

The processes in steps 1004 and 1005 will be described in detail with reference to FIG. 11.

If it is determined at step 1005 that the face candidate is not a human face, the process returns to step 1004, otherwise to step 1006 to process further the image including the human face, for example to remove the red eyes on the human face.

After that, the process proceeds to step 1007 to determine whether all the face candidates have been tested. If the answer is "yes", the process ends at step 1008, otherwise it returns to step 1004 to analyze other face candidates.

Figure 11:
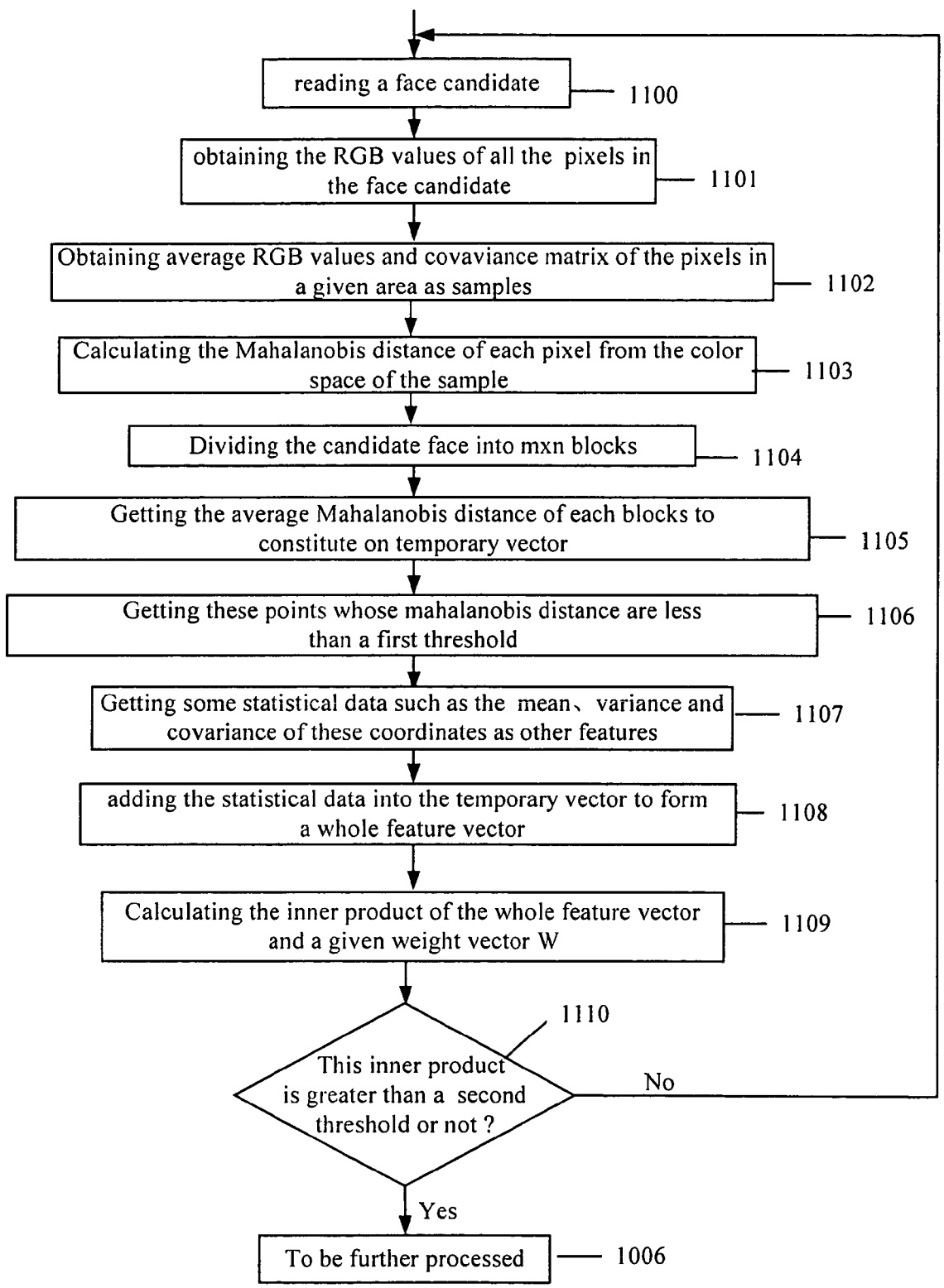
FIG. 11 is a flow chart showing in detail the processes in steps 1004 and 1005 of the method shown as FIG. 10 according to one embodiment of the present invention.

FIG. 11 is a flow chart showing in detail the processes in steps 1004 and 1005 of the method shown as FIG. 10 according to one embodiment of the present invention.

As shown in FIG. 11, at step 1100, a face candidate, including a plurality of pixels, is read from the memory (not shown) of the digital computer 10 (see FIG. 9).

Then, at step 1101, the RGB values of all the pixels in the face candidate can be obtained.

At step 1102, a given area in the face candidate is determined to calculate the average RGB values and the covariance matrix of the pixels in this area as the samples of the skin colors of the face candidate.

In the present embodiment, the samples of the skin colors are R (red), G (green) and B (blue) values of the skin colors of the face candidate. Alternatively, the samples of the skin colors may be other values reflecting the skin colors of the face candidate.

According to the preferred embodiment, the given area is determined as follows.

A coordinate system is set up, wherein the x-axis is positioned by crossing two points, which are deemed as the left eye and the right eye in the face candidate, the origin is positioned at the midpoint between the two points and the y-axis is in the direction of crossing another point, which is deemed as the nose in the face candidate (referring to FIG. 2).

In FIG. 2, reference signs 201 and 202 indicate the two eyes of the face candidate, and reference sign o indicates the origin of the coordinate system, respectively.

Assuming the distance between one of the two points and the origin is 1. The area A={(x,y)||x|<0.8; 0<y<1} is always in the face. In this case, the RGB values $C_r$, $C_g$ and $C_b$ of all the pixels in area A can be obtained. Thus, the average RGB values $\bar{c}_r$, $\bar{c}_g$ and $\bar{c}_b$, and the covariance matrix of the pixels in the area can also be obtained and are taken as the samples of the skin colors of the face candidate (step 1102).

Secondly, the relative distances, from the color space of the samples, of all the pixels in the face candidate are calculated (step 1103). In the preferred embodiment, the relative distances means the Mahalanobis distances of all the pixels in the face candidate from the samples. Alternatively, the relative distances may be Euclidean Distances.

In the preferred embodiment, the Mahalanobis distance, from the color space of the samples, of each pixel in the face candidate is calculated based on the following equation:

$$d = (c-\bar{c})^T \Sigma_c^{-1} (c-\bar{c}) \quad (1)$$

where d denotes a Mahalanobis distance for a pixel; $\bar{c}$ an average RGB vector consisting of the average RGB values $\bar{c}_r$, $\bar{c}_g$ and $\bar{c}_b$ of the pixels in the given area A; c a RGB vector consisting of the obtained values $C_r$, $C_g$ and $C_b$ of the pixel, $\Sigma_c^{-1}$ the contrary matrix of the covariance matrix of the pixels in the given area, and "T" denotes transformation of a vector or matrix.

Here, $\bar{c}$, $\Sigma_c$, $\Sigma_c^{-1}$ and d are substantially the same as $\bar{x}$, $\Sigma$, $\Sigma^{-1}$ and d, which are discussed with reference to FIG. 1, respectively, and the given area corresponds to the skin color reference portion, although their description are different in form.

Figure 12A:
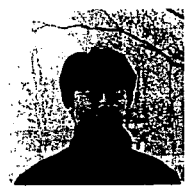
Figure 12B:

FIG. 12a shows a face candidate. FIG. 12b shows a picture where the above Mahalanobis distance values are taken as the brightness of the pixel. In FIG. 12b, the darker the pixel is, the less the Mahalanobis distance between this pixel and the samples of the skin color is.

Thirdly, a feature vector for the face candidate is constituted based on the relative distances. The following is a description of constituting the feature vector in the case of taking the Mahalanobis distances as the relative distances.

At step 1104, the face candidate is divided into m*n blocks, then the average Mahalanobis distance of each block can be calculated to obtain m*n average Mahalanobis distances that can constitute a temporary vector having m*n dimensions (step 1105).

The m and n are positive integers ranging from 1 to 40. In this embodiment, m=4 and n=5 (FIG. 12c).

Next, the Mahalanobis distances of all the pixels in the face candidate are compared with a first threshold to get those pixels having the Mahalanobis distances less than the first threshold (step 1106).

The first threshold is a real number ranging from 2 to 13. In this embodiment, it is 5.

Then, the statistical data, such as mean values (two dimensions), variance (two dimensions) and covariance (one-dimension), of the coordinates (x and y coordinates) of the pixels whose Mahalanobis distances are less than the first threshold can be calculated (step 1107).

Assuming $\bar{c}$ and $\Sigma_c$ denote the mean values and covariance matrix respectively, then $(c-\bar{c})^T \Sigma_c^{-1}(c-\bar{c})=1$ denotes the ellipse shown in FIG. 12d.

At step 1108, adding the five dimensions statistical data into the temporary vector formed at step 1105 to constitute a whole feature vector.

Finally, the face candidate is analyzed to determine whether or not it is a human face.

At step 1109, the inner product of the whole feature vector and a given weight vector w is calculated.

At step 1110, it is judged whether or not the inner product is greater than a second threshold. If the answer is Yes, the face candidate is determined as a real face. Then the process proceeds to step 1006, otherwise to step 1100.

The given weight vector w and the second threshold can be obtained by a training program using a conventional method such as the Linear Fisher method or Linear SVM.

In this preferred embodiment, the second threshold is −1094, and the given weight vector w is as follows:

$$w[25] = \begin{Bmatrix} 12.24, & 1.29, & -18.39, & -9.88, & 9.46, \\ -6.53, & -14.41, & -189.22, & -10.10, & -6.08, \\ -20.15, & -8.89, & -210.78, & 12.08, & -5.90, \\ 18.48, & -1.56, & -15.41, & -6.94, & 7.27, \\ 74.87, & 12.95, & -301.22, & 7.61, & -11.36 \end{Bmatrix}.$$

The apparatus for detecting a human face according to the invention will be described in detail.

As mentioned above, the apparatus as shown in FIG. 1 is suitable for practicing the method for detecting a human face according to the present invention. To fulfill the invention, the computer 12 includes an obtaining means for obtaining the samples of the skin colors of a face candidate; a calculating means for calculating the relative distances, from the color space of the samples, of all the pixels in the face candidate; a constituting means for constituting a feature vector for the face candidate based on the relative distances; and an analyzing means for analyzing the face candidate to determine whether it is a human face.

Taking the two face candidates $C_1$ and $C_2$ shown respectively in FIG. 13a and FIG. 13b as two examples, the method for detecting a human face according to the invention will be described in a more detailed manner.

EXAMPLE 1

Table 1 shows the RGB values of a part of pixels in the given area $A_1=\{(x,y)||x|<0.8; 0<y<1\}$ of the face candidate $C_1$.

TABLE 1

| $R_1$ | $G_1$ | $B_1$ |
|---|---|---|
| 109 | 68 | 62 |
| 144 | 103 | 97 |
| 171 | 130 | 126 |
| 165 | 124 | 120 |
| 194 | 153 | 149 |
| 194 | 153 | 149 |
| 207 | 166 | 164 |
| 219 | 178 | 176 |
| . | . | . |
| . | . | . |
| . | . | . |
| 208 | 163 | 158 |
| 210 | 167 | 161 |
| 212 | 171 | 165 |
| 213 | 176 | 168 |
| 211 | 177 | 168 |
| 211 | 177 | 168 |
| 206 | 172 | 162 |

Where the $R_1$, $G_1$, and $B_1$ values in each row of Table 1 indicate R, G and B values of a sample pixel in the given area $A_1$, respectively. There are 1369 sample pixels in the area $A_1$, in which 15 sample pixels are listed in Table 1.

Then, the average RGB vector $\bar{c}$, the covariance matrix $\Sigma_c$, and the contrary matrix $\Sigma_c^{-1}$ of the covariance matrix $\Sigma_c$ are respectively as follows:

$$\bar{c} = [\,215 \quad 175 \quad 169\,]$$

$$\sum\nolimits_c = \begin{matrix} 861.45 & 917.81 & 914.19 \\ 917.81 & 1009.90 & 1007.10 \\ 914.19 & 1007.10 & 1018.00 \end{matrix}$$

$$\sum\nolimits_c^{-1} = \begin{matrix} 0.036632 & -0.035987 & 0.0027046 \\ -0.035987 & 0.10833 & -0.074846 \\ 0.0027046 & -0.074846 & 0.072594 \end{matrix}$$

Next, the Mahalanobis distances of all the pixels in face candidate $C_1$ will be calculated based on equation (1). For simplicity, the listed below are only the Mahalanobis distances of 25 pixels at left upper part of face candidate $C_1$.

22.58 22.74 17.69 17.81 17.88

22.69 22.69 17.69 18.16 18.66

17.51 17.42 12.97 13.42 14.10

17.95 17.88 13.30 13.49 13.63

18.32 18.57 14.01 13.78 13.42

The face candidate $C_1$ is divided into 4*5 blocks, then the average Mahalanobis distance of each block can be calculated to obtain 20 average Mahalanobis distances as follows:

64.75 7.86 1.48 4.76 47.74

11.37 1.29 1.52 2.52 3.94

76.73 4.74 1.50 0.50 0.23

120.42 45.33 13.80 29.00 55.92.

Thus, the coordinate values of the pixels, having Mahalanobis distances less than a predetermined first threshold (in this example, it is 5), can be obtained.

In example 1, there are 4313 pixels that have Mahalanobis distances less than 5. The listed below are the coordinates of 15 pixels belonging to the above 4313 pixels, where the x and y values in a row of table 2 are respectively indicative of coordinate values of a pixel.

TABLE 2

| x | y |
|---|---|
| −1.39 | −1.00 |
| −1.28 | −0.50 |
| −1.17 | −0.83 |
| −1.06 | −1.50 |
| −0.94 | −0.94 |
| −0.83 | 0.22 |
| −0.72 | 1.67 |
| −0.56 | 0.72 |
| −0.39 | 0.67 |
| −0.22 | −0.83 |
| −0.11 | 0.67 |
| 0.00 | 3.17 |
| 0.17 | 0.94 |
| 0.33 | 0.28 |
| 0.50 | 0.39 |

Then, the statistical data, such as mean values, variance and covariance, of the coordinates (x and y coordinates) of the pixels whose Mahalanobis distances are less than the first threshold can be calculated (step 1107).

The above-mentioned 4313 pixels have the following statistical data:

Mean values of the coordinates: −0.52 1.05
Variance of the coordinates: 1.20 1.25
covariance of x and y coordinates: 0.25.

Thus, a feature vector for the face candidate $C_1$ having 25 dimensions can be constituted as follows:

64.75 7.86 1.48 4.76 47.74
11.37 1.29 1.52 2.52 3.94
76.73 4.74 1.50 0.50 0.22
120.42 45.33 13.80 29.00 55.92
−0.52 1.05 1.20 1.25 0.25

An inner product of the feature vector and the given weight vector w can be obtained. For face candidate $C_1$, the inner product is 617.

As mentioned above, the second threshold is selected as −1094. Thus, the inner product for the face candidate $C_1$ is greater than the second threshold. As a result, it is determined that the face candidate $C_1$ is a human face.

EXAMPLE 2

Table 3 shows the RGB values of a part of pixels in the given area $A_2=\{(x,y) \;|x|<0.8; 0<y<1\}$ of the face candidate $C_2$.

TABLE 3

| $R_2$ | $G_2$ | $B_2$ |
|---|---|---|
| 147 | 140 | 147 |
| 146 | 139 | 146 |
| 139 | 132 | 139 |
| 138 | 131 | 138 |
| 145 | 138 | 145 |
| 144 | 137 | 144 |
| 138 | 131 | 138 |
| 148 | 141 | 148 |
| 150 | 143 | 150 |
| 131 | 122 | 127 |
| . | . | . |
| . | . | . |
| . | . | . |
| 85 | 89 | 100 |
| 78 | 82 | 93 |
| 102 | 109 | 119 |
| 90 | 97 | 107 |
| 92 | 96 | 105 |

TABLE 3-continued

| $R_2$ | $G_2$ | $B_2$ |
|---|---|---|
| 91 | 95 | 104 |
| 86 | 90 | 101 |
| 95 | 99 | 110 |
| 114 | 118 | 129 |

Where the $R_2$, $G_2$ and $B_2$ values in each row of Table 3 indicate respectively R, G and B values of a sample pixel in the given area $A_2$. There are 6241 sample pixels in the area $A_2$, in which 19 sample pixels are listed in Table 3.

For face candidate $C_2$, $\bar{c}$, $\Sigma_c$ and $\Sigma_c^{-1}$ are respectively as follows:

$$\bar{c} = [116.55 \;\; 117.94 \;\; 129.18]$$

$$\Sigma_c = \begin{matrix} 1098.00 & 1039.70 & 1021.50 \\ 1039.70 & 1000.10 & 982.31 \\ 1021.50 & 982.31 & 976.57 \end{matrix}$$

$$\Sigma_c^{-1} = \begin{matrix} 0.058394 & -0.058995 & 0.0017409 \\ -0.058995 & 0.14285 & -0.081978 \\ -0.001740 & -0.081978 & 0.085305 \end{matrix}$$

Similarly, a feature vector for the face candidate $C_2$ having 25 dimensions can be constituted as follows:

1.27 3.30 1.21 19.07 3.59
7.98 4.29 10.82 2.88 3.61
1.74 3.43 1.80 4.85 0.43
7.94 4.99 6.48 1.60 4.68
0.01 0.96 1.03 1.21 0.09

The inner product of the feature vector for the face candidate $C_2$ and the weight vector w is −2988.4, which is less than the second threshold −1094.

As a result, it is determined that the face candidate $C_2$ is not a human face.

It is evident that the method and apparatus for detecting a human face according to the invention can be employed to detect and verify a plurality of human faces in one image.

As described above, according to the present invention, a human face in one image is detected and verified based on the relative distances, from the color space of the samples, of all the pixels in a face candidate. Therefore, the results determined by the method and apparatus for detecting human face according to the invention are not affected by the illumination conditions under which the image is captured, and the races of the people whose faces are to be detected. As a result, the accuracy of determining human faces in an image can be highly increased.

Although the described method and apparatus for detecting a red eye and the described method and apparatus for detecting a human face are described separately in different embodiments of the present invention, they may be combined. For example, according to one embodiment, in an image processing system, the method and apparatus for detecting a human face are firstly adopted so as to identify one or more human faces, then the method and apparatus for detecting a red eye are adopted so as to identify one and more red eyes within the identified human faces. But such combination constitutes no restriction to the present invention.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A method of detecting a red eye in an image, characterized by comprising steps of:
    calculating a skin color reference vector for said image;
    identifying a candidate for red eye region in said image;
    identifying skin color pixels in said candidate for red eye region;
    removing skin color pixels from said candidate for red eye region;
    deciding whether said candidate for red eye region is a red eye or not.

2. The method according to claim 1, characterized in that said step of calculating a skin color reference vector comprises steps of:
    identifying a face rectangle in said image;
    identifying a skin color reference portion in said face rectangle; and
    calculating said skin color reference vector based on color values of pixels included in said skin color reference portion.

3. The method according to claim 2, characterized in that:
    said skin color reference portion is an area between two eyes in said face rectangle;
    said skin color reference vector comprises a R value, a G value and a B value, wherein
    said R value is an average red color value for pixels included in said skin color reference portion,
    said G value is an average green color value for pixels included in said skin color reference portion, and
    said B value is an average blue color value for pixels included in said skin color reference portion.

4. The method according to claim 3, characterized in that said step of identifying skin color pixels in said candidate for red eye region comprises steps of:
    calculating a distance between said skin color reference vector and a color vector for each pixel included in said candidate for red eye region; and
    identifying a pixel as a skin color pixel if the distance of said pixel and the distances of pixels in the neighborhood of said pixel are all less than a first threshold.

5. The method according to claim 4, characterized in that said distance of a pixel is calculated as $(x-\bar{x})^T \Sigma^{-1} (x-\bar{x})$, wherein x represents a color vector of said pixel, $\bar{x}$ represents said skin color reference vector, and $\Sigma$ represents a covariance matrix for pixels in said skin color reference portion; and that said first threshold ranges from 5 to 20.

6. A computer-readable medium encoded with a computer program for detecting a red eye in an image, the computer-readable medium including instructions for causing a processor to implement the method according to claim 1.

7. An apparatus for detecting a red eye in an image, characterized by comprising:
    a calculator adapted to calculate a skin color reference vector for said image;
    a candidate identifier circuit adapted to identify a candidate for red eye region in said image;
    a candidate processor adapted to identify skin color pixels in said candidate for red eye region, and to remove said skin color pixels from said candidate for red eye region; and
    a deciding unit adapted to decide whether said candidate for red eye region output by said candidate processor is a red eye or not.

8. The apparatus according to claim 7, wherein said calculator comprises:
    a face rectangle identifier circuit adapted to identify a face rectangle in said image;
    means for identifying a skin color reference portion in said face rectangle; and
    a vector calculator adapted to calculate said skin color reference vector based on color values of pixels included in said skin color reference portion.

* * * * *